United States Patent
Watanabe et al.

(10) Patent No.: US 12,420,860 B2
(45) Date of Patent: Sep. 23, 2025

(54) VEHICLE STEERING SYSTEM

(71) Applicants: HONDA MOTOR CO., LTD., Tokyo (JP); THYSSENKRUPP PRESTA AKTIENGESELLSCHAFT, Eschen (LI)

(72) Inventors: Yoshinobu Watanabe, Saitama (JP); Levente Pasztor, Budapest (HU); Adam Szabo, Budapest (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 391 days.

(21) Appl. No.: 17/642,276

(22) PCT Filed: Sep. 13, 2019

(86) PCT No.: PCT/JP2019/036075
§ 371 (c)(1),
(2) Date: Mar. 11, 2022

(87) PCT Pub. No.: WO2021/049001
PCT Pub. Date: Mar. 18, 2021

(65) Prior Publication Data
US 2022/0297744 A1    Sep. 22, 2022

(51) Int. Cl.
*B62D 5/00*      (2006.01)
*B62D 5/04*      (2006.01)
*B62D 6/00*      (2006.01)

(52) U.S. Cl.
CPC ......... *B62D 5/0469* (2013.01); *B62D 5/0421* (2013.01); *B62D 6/002* (2013.01); *B62D 6/008* (2013.01)

(58) Field of Classification Search
CPC .... B62D 5/0469; B62D 5/0421; B62D 6/002; B62D 6/008
See application file for complete search history.

(56) References Cited

U.S. PATENT DOCUMENTS

| 7,900,742 B2 | 3/2011 | Kubokawa et al. |
| 10,351,165 B2 | 7/2019 | Katayama et al. |

(Continued)

FOREIGN PATENT DOCUMENTS

| CN | 1978266 A | 6/2007 |
| CN | 108100028 A | 6/2018 |

(Continued)

OTHER PUBLICATIONS

International Search Report for Patent Application PCT/JP2019/036075 mailed Jun. 5, 2020; 2 pp.

(Continued)

*Primary Examiner* — Ramya P Burgess
*Assistant Examiner* — Brittany Renee Peko
(74) *Attorney, Agent, or Firm* — Armstrong Teasdale LLP

(57) ABSTRACT

The vehicle steering control system includes a control unit configured to control the steering actuator to achieve the steered angle based on at least one of the steering angle and the steering torque. The control unit executes an output restriction control to restrict an output of the steering actuator when a steering torque is equal to or greater than a prescribed threshold value, and cancels the output restriction control when the detection unit has detected a prescribed mode of operation by the operator while the output restriction control is being executed.

6 Claims, 7 Drawing Sheets

(56) References Cited

U.S. PATENT DOCUMENTS

| | | |
|---|---|---|
| 10,532,742 B2 | 1/2020 | Katayama et al. |
| 11,214,303 B2* | 1/2022 | Shibata .................. B62D 6/008 |
| 2003/0045981 A1 | 3/2003 | Kifuku et al. |
| 2004/0211618 A1 | 10/2004 | Ogawa et al. |
| 2009/0026994 A1* | 1/2009 | Namuduri .............. G05B 23/02 |
| | | 318/565 |
| 2012/0055731 A1 | 3/2012 | Lee |
| 2012/0123643 A1* | 5/2012 | Limpibuntering .............. 701/42 |
| 2020/0130737 A1* | 4/2020 | Kodera .................. B62D 6/008 |
| 2021/0009198 A1* | 1/2021 | Suzuki .................. B62D 6/002 |
| 2021/0245796 A1* | 8/2021 | Aoki ..................... B62D 5/0412 |
| 2022/0032994 A1* | 2/2022 | Fusconi ............... B62D 5/0463 |

FOREIGN PATENT DOCUMENTS

| | | | | |
|---|---|---|---|---|
| CN | 108116488 A | | 6/2018 | |
| EP | 1407959 A2 | | 4/2004 | |
| EP | 3162659 A2 | | 5/2017 | |
| JP | 2004322715 A | | 11/2004 | |
| JP | 2012051558 A | | 3/2012 | |
| JP | 2019130957 A | * | 1/2018 | .............. B62D 6/00 |
| JP | 2020069883 A | * | 10/2018 | .............. B62D 5/04 |

OTHER PUBLICATIONS

Notice of Reasons for Refusal for Japanese Patent Application No. 2022-538490 dated Mar. 7, 2023; 8 pp.
Office Action for Chinese Patent Application No. 2019801002490 received Mar. 19, 2024; 9 pps.

* cited by examiner

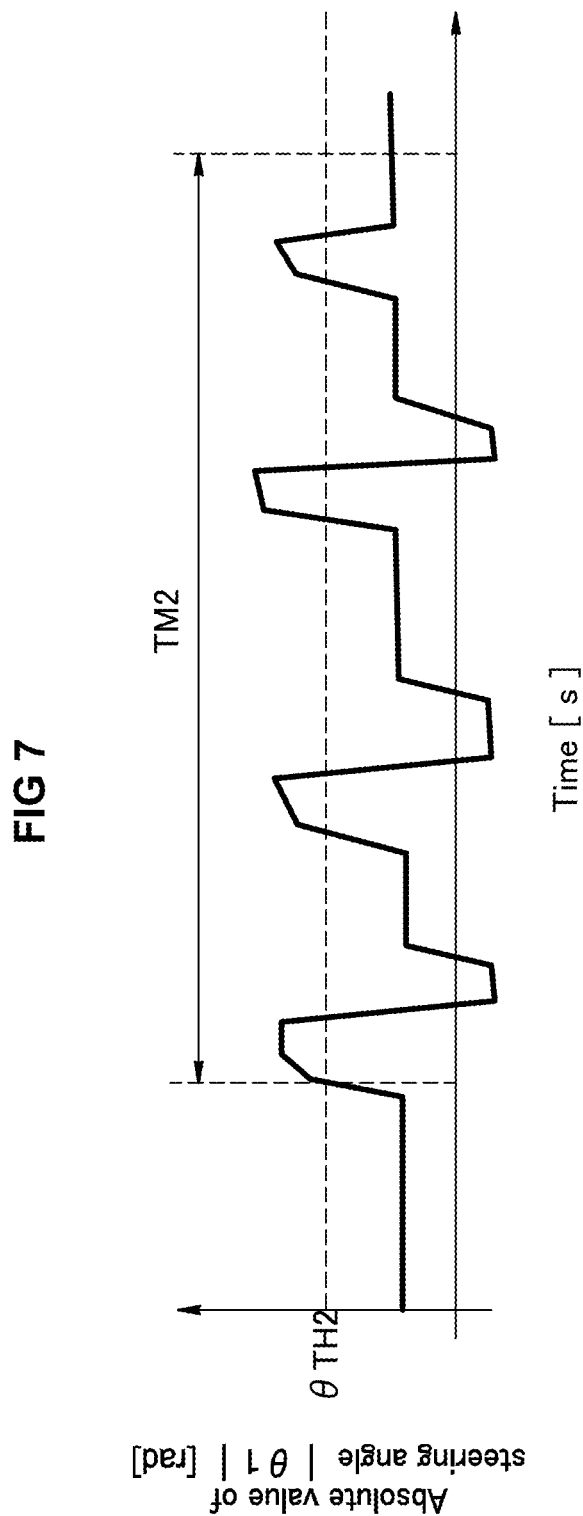

VEHICLE STEERING SYSTEM

TECHNICAL FIELD

The present invention relates to a vehicle steering system.

BACKGROUND ART

A known steer-by-wire vehicle steering system includes a steering member such as a steering wheel operated by an operator, and a steering mechanism which is mechanically separated from the steering member and changes a steered angle of road wheels according to a steering input from the steering member. The steering mechanism includes an electric motor that generates a driving force for changing the steering angle of the road wheels. In such a vehicle steering system, it is known to execute an output restriction control process by which an overload condition of the electric motor is detected, and upon occurrence of an overload condition, limit the electric current supplied to the electric motor (See, for example, Japanese Unexamined Patent Application Publication No. JP2004-322715A). According to such an output restriction control process, when the wheel comes into contact with an obstacle such as a curb, and the resistance to the steering operation becomes great, undesired power consumption can be avoided, and the steering mechanism including the electric motor can be protected from mechanical damages.

However, when an output restriction control process is activated, the steering of the wheels is restricted even when the operator desires to move one of the wheels out of a rut or a groove in the road surface with the result that the operator may be unable to get the wheel out of the rut or the groove.

In view of such a problem of the prior art, a primary object of the present invention is to provide a steering control system equipped with an output restriction mechanism that can allow the wheel to get out of a rut or a groove without any difficulty.

SUMMARY OF INVENTION

To achieve such an object, the present invention provides a vehicle steering system, comprising: a steering member; a steering angle sensor configured to detect a steering angle of the steering member; a torque sensor configured to detect a steering torque applied to the steering member; a steering mechanism configured to steer a wheel; a steering actuator configured to apply a drive force to the steering mechanism; a steered angle sensor configured to detect a steered angle of the wheel; a detection unit configured to detect an input operation performed by an operator on the steering member; and a control unit configured to control the steering actuator so as to cause the steered angle to correspond to the steering angle and/or the steering torque; wherein the control unit is configured to perform an output restriction control including restricting an output of the steering actuator when the steering torque is equal to or greater than a prescribed threshold value, and to cancel the output restriction control when the input operation performed by the operator is received while the output restriction control is being executed.

Thus, the vehicle steering system cancels the output restriction control upon detecting the prescribed mode of operation by the operator. Therefore, a relatively large electric power can be supplied to the steering actuator so that the wheel can be steered out of the rut or the groove. Thereby, even when the vehicle steering system is provided with the function of the output restriction control, the wheel can be steered successfully steered out of the rut or the groove.

Preferably, the detection unit comprises at least one of the torque sensor and the steering angle sensor, and the control unit is configured to cancel the output restriction control when at least one of the steering torque and the steering angle has continued to be equal to or greater than a prescribed threshold value for a prescribed time period.

Thus, the control unit cancels the output restriction control upon detecting a continued application of at least one of the steering torque and the steering angle equal to or greater than the threshold value.

Preferably, the detection unit comprises at least one of the torque sensor and the steering angle sensor, and the control unit is configured to cancel the output restriction control when at least one of the steering torque and the steering angle has come to be equal to or greater than a prescribed threshold value by a prescribed number of times within a prescribed time period.

Thus, the control unit cancels the output restriction control upon detecting applications of at least one of the steering torque and the steering angle by a prescribed number of times within a prescribed time period.

Preferably, the detection unit comprises a manual switch configured to be operated by the operator, and the control unit is configured to cancel the output restriction control when the manual switch is operated.

Thus, the control unit cancels the output restriction control upon detecting an operation of the manual switch by the operator.

The present invention provides a steering control system equipped with an output restriction mechanism that can allow the wheel to get out of a rut or a groove without any difficulty.

BRIEF DESCRIPTION OF DRAWINGS

FIG. 7 is a graph showing the absolute value of the steering angle corresponding to the second mode of operation for releasing the output restriction control.

DESCRIPTION OF EMBODIMENTS

Figure 1:
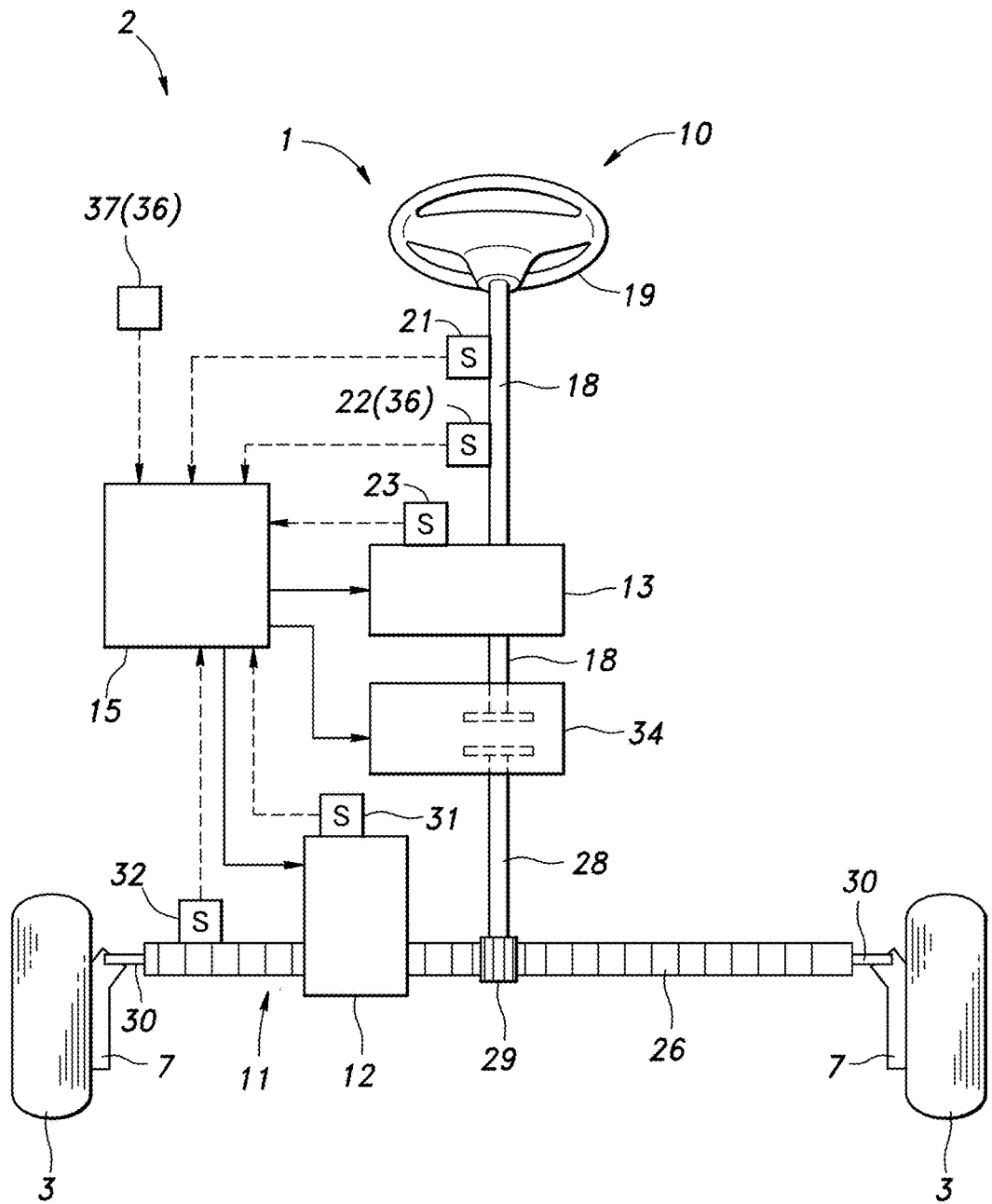
FIG. 1 is a schematic diagram of a vehicle steering system according to an embodiment of the present invention.

An embodiment of a vehicle steering system 1 according to the present invention is described in the following. As shown in FIG. 1, the vehicle steering system 1 consists of a steer-by-wire (SBW) steering system. A vehicle 2 provided with the vehicle steering system 1 is a four-wheeled vehicle including a pair of front wheels 3 and a pair of rear wheels (not shown in the drawings). Each front wheel 3 is supported by the vehicle body via a knuckle 7 thereof so that the steered angle can be changed, and thus serves as a steerable wheel. The steered turning is defined as an angle of the steerable wheel or the front wheel 3 with respect to the fore and aft direction in plan view. The vehicle steering system 1 changes the steered angle of the front wheels 3.

The vehicle steering system 1 includes a steering member 10 rotatably provided on the vehicle body, a steering mechanism 11 that steers the front wheels 3, a steering actuator 12 that applies a driving force to the steering mechanism 11, a reaction force actuator 13 that applies a reaction torque the steering member 10, and a control unit 15 that controls the reaction force actuator 13 and the steering actuator 12. The vehicle steering system 1 may be provided with a redundancy for an enhanced reliability. For instance, the vehicle steering system 1 may be provided with a plurality of steering actuators 12, a plurality of reaction force actuators 13, and/or a plurality of control units 15.

The steering member 10 includes a first steering shaft 18 that is rotatably supported by the vehicle body, and a steering wheel 19 provided at a rear end (lower end) of the first steering shaft 18. The first steering shaft 18 is rotatably supported by a steering column (not shown in the drawings) provided on the vehicle body, and the rear end thereof protrudes rearward from the steering column. The steering wheel 19 is connected to the rear end of the first steering shaft 18 so as to rotate integrally with the first steering shaft 18.

The reaction force actuator 13 consists of an electric motor, and is connected to the first steering shaft 18 via a gear mechanism. When the reaction force actuator 13 is driven, the driving force is transmitted to the first steering shaft 18 as a rotational torque. The reaction force actuator 13 thus applies a reaction torque to the first steering shaft 18.

The vehicle steering system 1 further includes a steering angle sensor 21 that detects a rotational angle of the first steering shaft 18 around the central axial line thereof as a steering angle. The steering angle sensor 21 may be a per se known rotary encoder. Further, the vehicle steering system 1 includes a torque sensor 22 that detects torque applied to the first steering shaft 18 as steering torque. The torque sensor 22 detects the torque applied to a part of the first steering shaft 18 located between the steering wheel 19 and the reaction force actuator 13. The steering torque is determined by the operation torque applied to the steering wheel 19 by the operator and the reaction force torque applied to the first steering shaft 18 by the reaction force actuator 13. The torque sensor 22 may be a per se known torque sensor such as a magnetostrictive torque sensor and a strain gauge. The reaction torque can also be detected from the electric current supplied to the reaction for actuator 13.

The vehicle steering system 1 further includes a reaction force actuator rotational angle sensor 23 that detects the rotational angle of the reaction force actuator 13. The reaction force actuator rotational angle sensor 23 may be a per se known resolver or rotary encoder.

The steering mechanism 11 includes a rack shaft 26 extending laterally, and a second steering shaft 28 having a pinion 29 meshing with the rack shaft 26 affixed at the front end thereof. The rack shaft 26 is supported by the vehicle body so as to be movable in the lateral direction. The left and right ends of the rack shaft 26 are connected to knuckles 7 that support the left and right front wheels 3 via tie rods 30, respectively. As the rack shaft 26 moves in the lateral direction, the steered angle of the front wheels 3 changes. The rotation of the second steering shaft 28 is converted into a linear motion of the rack shaft 26 in the lateral direction. The second steering shaft 28 is separated from the first steering shaft 18, and is rotatable independently from the first steering shaft 18. The pinion 29 and the second steering shaft 28 are not essential components and can be omitted.

The steering actuator 12 consists of an electric motor, and applies a driving force to the rack shaft 26 or the second steering shaft 28. Thus, the steering actuator 12 may transmit the driving force either directly to the rack shaft 26 or to the rack shaft 26 via the second steering shaft 28. The steering actuator 12 moves the rack shaft 26 in the lateral direction so as to change the steered angle of the left and right front wheels 3 in a corresponding manner.

The vehicle steering system 1 includes a steering actuator rotational angle sensor 31 that detects the rotational angle of the steering actuator 12. The steering actuator rotational angle sensor 31 may consist of a per se known resolver or rotary encoder. In addition, the vehicle steering system 1 includes a steered angle sensor 32 that detects the steered angle of the front wheels 3. In the present embodiment, the steered angle sensor 32 consists of a rack stroke sensor that detects a rack position or the position of the rack shaft 26 in the lateral direction, and detects the steered angle of the front wheels 3 based on the rack position.

A clutch device 34 is provided between the first steering shaft 18 and the second steering shaft 28. The clutch device 34 selectively disconnects the first steering shaft 18 and the second steering shaft 28 from each other. The clutch device 34 may be configured as, for example, a planetary gear mechanism. The clutch device 34 has an electric actuator (not shown) for selectively activating the clutch device 34.

Figure 5:
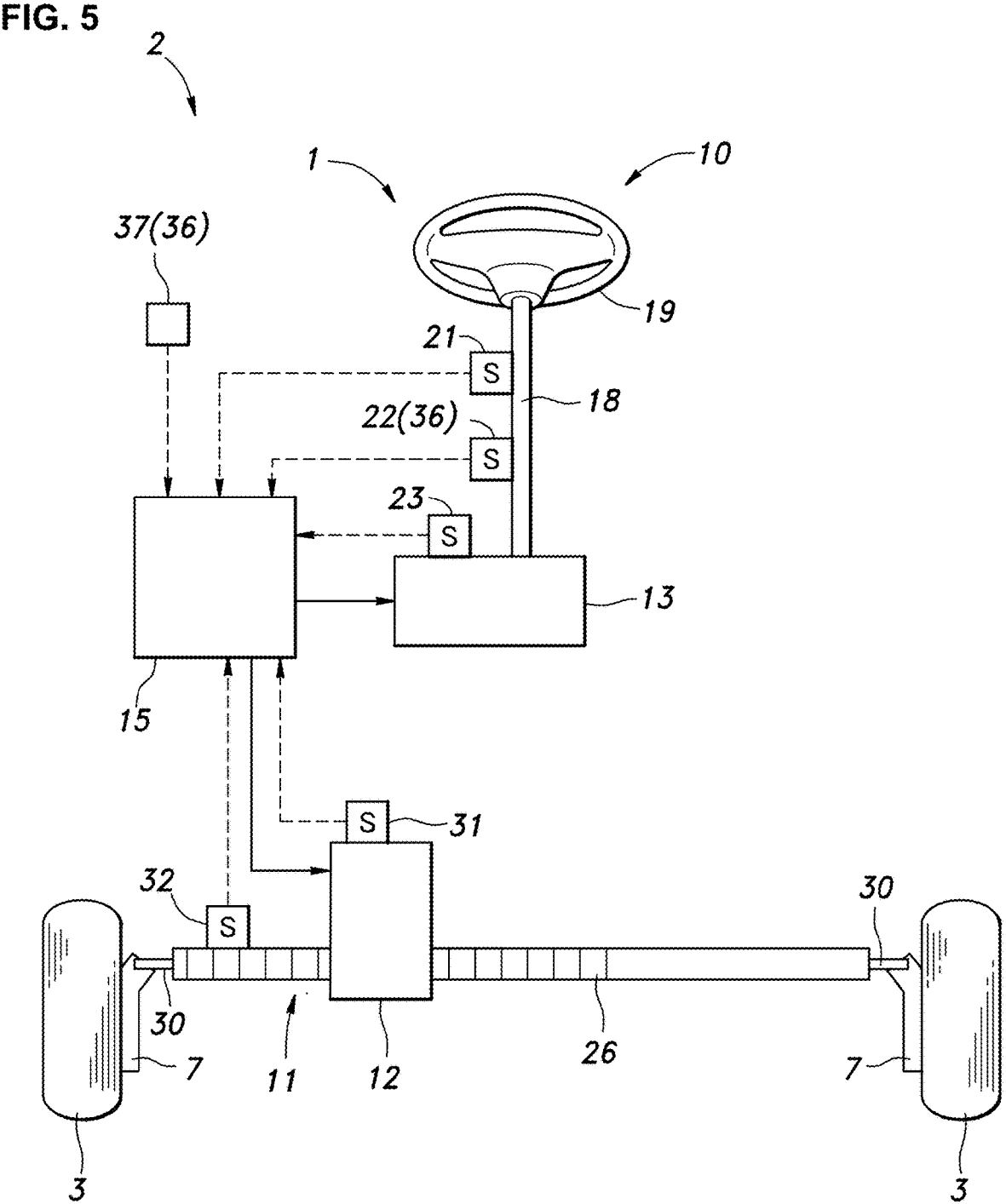
FIG. 5 is a schematic diagram of a vehicle steering system according to another embodiment of the present invention.

The clutch device 34 is not an essential component and can be omitted as shown in FIG. 5. In this case, the pinion 29 and the second steering shaft 28 are also omitted together with the clutch device 34.

The vehicle steering system 1 further includes a detection device 36 that detects an operator's input operation. The detection device 36 may include a torque sensor 22 and/or a steering angle sensor 21 that detects an operator's steering operation. The detection device 36 may include a switch 37 that is operated by the operator. The switch 37 may be a mechanical switch provided on the vehicle body or a function button displayed on a touch panel display.

The control unit 15 is an electronic control device including a CPU, memory, a storage device storing a program, and the like. The control unit 15 is connected to the steering angle sensor 21, the torque sensor 22, the reaction force actuator rotational angle sensor 23, a steering actuator rotational angle sensor 31, and a steered angle sensor 32. Based on the signals from these sensors, the control unit 15 acquires signals corresponding to the steering angle, steering torque, reaction force actuator rotational angle, steering actuator rotational angle, and steering angle. In addition, the control unit 15 may be connected to a vehicle speed sensor, a yaw rate sensor, and a fore and aft acceleration sensor (not shown in the drawings) to acquire the vehicle speed, the yaw rate, the fore and aft acceleration, and the like.

The control unit 15 is connected to the reaction force actuator 13, the steering actuator 12, and the clutch device 34, and controls the reaction force actuator 13, the steering actuator 12, and the clutch device 34. The control unit 15 controls the reaction force actuator 13, the steering actuator 12, and the clutch device 34 in the SBW (steer-by-wire) mode or EPS (electric power steering) mode. When the clutch device 34 is omitted, the control unit 15 may control the reaction force actuator 13 and the steering actuator 12 corresponding to only the SBW mode.

The control unit 15 disconnects the clutch device 34 in the SBW mode, and allows the first steering shaft 18 and the second steering shaft 28 to rotate independently from each other. In the SBW mode, the control unit 15 controls the steering actuator 12 so as to realize a steered angle corresponding to at least one of the steering angle and the steering torque, and controls the reaction force actuator 13 according to the steering angle.

A mode of operation of the control unit 15 in the SBW mode is described in the following. The control unit 15 computes a target steering angle based on the steering angle detected by the steering angle sensor 21. For example, the control unit 15 may compute the target steering angle θ2T by multiplying the steering angle θ1 by a predetermined gear ratio K (θ2T=θ1×K). The gear ratio K may be, for example, 0.01 to 0.5, and may be 0.125 for example. Then, the control unit 15 controls the steering actuator 12 based on the deviation Δθ2 (=θ2T−θ2) between the target steering angle θ2T and the actual steering angle θ2 so that the deviation of the active steering angle θ2 from the target steering angle θ2T is reduced, and computes the corresponding current value A1 to be supplied to the steering actuator 12. In other words, the control unit 15 performs a feedback control of the steering actuator 12 based on the deviation 4θ2. As the deviation Δθ2 increases, the current value A1 supplied to the steering actuator 12 increases, and the output of the steering actuator 12 increases so that the amount of change in the steering angle increases.

The control unit 15 may compute a reaction force torque to be generated by the reaction force actuator 13 based by multiplying the deviation Δθ2 with a predetermined coefficient. The control unit 15 computes the electric current value A2 to be supplied to the reaction force actuator 13 based on the computed reaction force torque. The current value A2 to be supplied to the reaction force actuator 13 may be determined by referring to a predetermined map based on the required reaction force torque. In another embodiment, the control unit 15 determines the current value A2 by referring to a predetermined map based on the deviation Δθ2. The reaction force torque and the current value A2 become greater in value as the steering angle deviation Δθ2 increases.

The control unit 15 supplies the current value A2 to the reaction force actuator 13 so as to cause the reaction force actuator 13 to generate a corresponding driving force. The driving force generated by the reaction force actuator 13 is applied to the first steering shaft 18 as a reaction force torque that resists the operator's input operation. Accordingly, the operator can receive a reaction force (resistance force) in response to the steering operation from the steering wheel 19.

The control unit 15 executes output restriction control which causes the output of the steering actuator 12 to be limited when the absolute value |T| of the steering torque T is equal to or greater than a predetermined threshold value T1. The output restriction control prevents a relatively large current from being continuously supplied to the steering actuator 12 in a situation where the front wheels 3 encounter a significant resistance to a steering movement thereof. The situation in which the front wheels 3 encounter a significant resistance occurs, for example, when one of the front wheels 3 comes into contact with an obstacle such as a curbstone, or when one of the front wheels 3 drops into or gets caught in a groove on the road surface such as a rut or a gutter, and the front wheel 3 is pushed against the side wall of the rut or the gutter. By limiting the electric current supplied to the steering actuator 12, an excessive power consumption, and an excessive rise in the temperature of the steering actuator 12 can be avoided. Moreover, the load applied to the steering mechanism 11 can be limited by restricting the output generated by the steering actuator 12.

Figure 2:
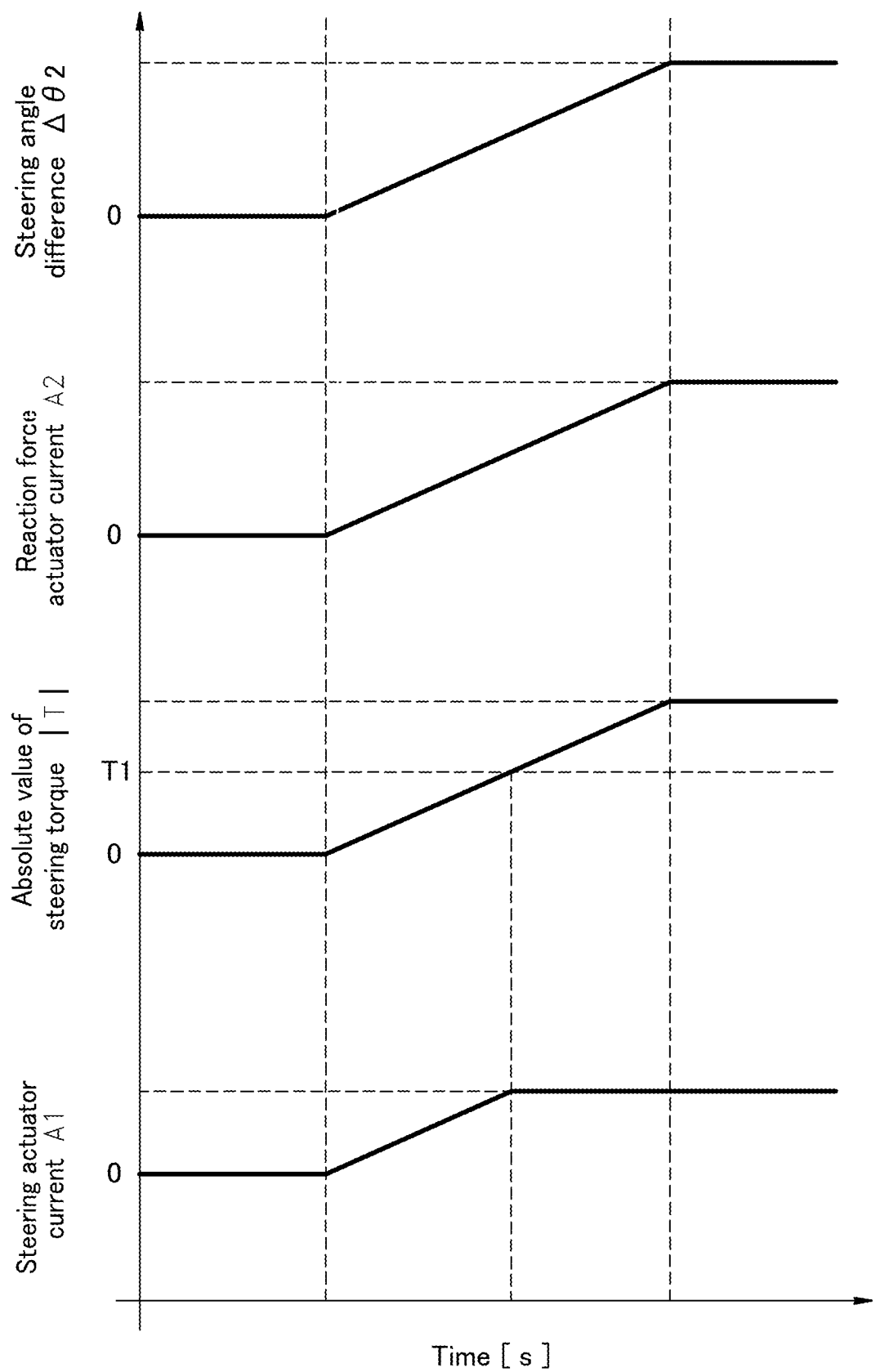
FIG. 2 is a time chart showing the relationship between the steering angle deviation $\Delta\theta 2$, the reaction force actuator current value A2, the steering torque absolute value |T|, and the steering actuator current value A1 in the output restriction control.

For example, the control unit 15 may limit the current value A1 supplied to the steering actuator 12 in the output restriction control. As shown in FIG. 2, for example, the control unit 15 may execute the output restriction control when the absolute value |T| is equal to or greater than the threshold value T1, and keeps the current value A1 supplied to the steering actuator 12 constant. Further, for example, in the output restriction control, the control unit 15 may limit the increase rate of the current value A1 with respect to the increase rate of the deviation Δθ2 in the steering angle. In the output restriction control, the control unit 15 may supply the steering actuator 12 with a current value A1 that is equal to or less than the current value A1 when the absolute value |T| of the steering torque has reached the threshold value T1.

The control unit 15 cancels the output restriction control when the detection device 36 receives a predetermined operation by the operator according to the present invention. In the present embodiment, as described above, the detection device 36 is formed by at least one of the torque sensor 22 and the switch 37. The control unit 15 cancels the output restriction control based on at least one of the steering torque detected by the torque sensor 22 and the state of the switch 37. The predetermined operation by the operator may include, for example, the following first to third operations. The control device may release the output suppression control when detecting at least one of the first to third modes of operations. The control unit 15 may be configured to cancel the output restriction control based on one selected from the first to third modes of operations.

Figure 3:
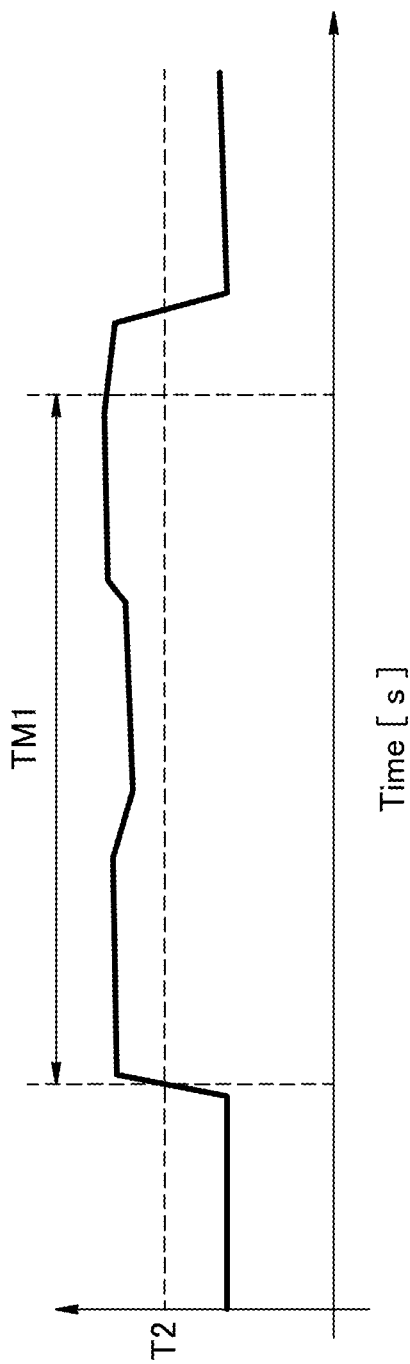
FIG. 3 is a graph showing the absolute value of the steering torque corresponding to the first mode of operation for releasing the output restriction control.

As shown in FIG. 3, for example, when the absolute value |T| of the steering torque detected by the torque sensor 22 continues to be equal to or greater than a predetermined threshold T2 for a prescribed time period TM1, the control unit 15 determines that the first mode of operation is performed by the operator, and cancels the output restriction control. The first mode of operation here corresponds to an operation in which the operator continues to apply at least a certain amount of torque to the steering wheel 19 against the reaction force torque for the predetermined period. The measurement of the time period TM1 is started when the absolute value |T| of the steering torque has changed from a value less than the threshold value T2 to a value equal to or greater than the threshold value T2. The measurement is reset once the absolute value |T| of the steering torque falls below the threshold value T2.

Figure 4:
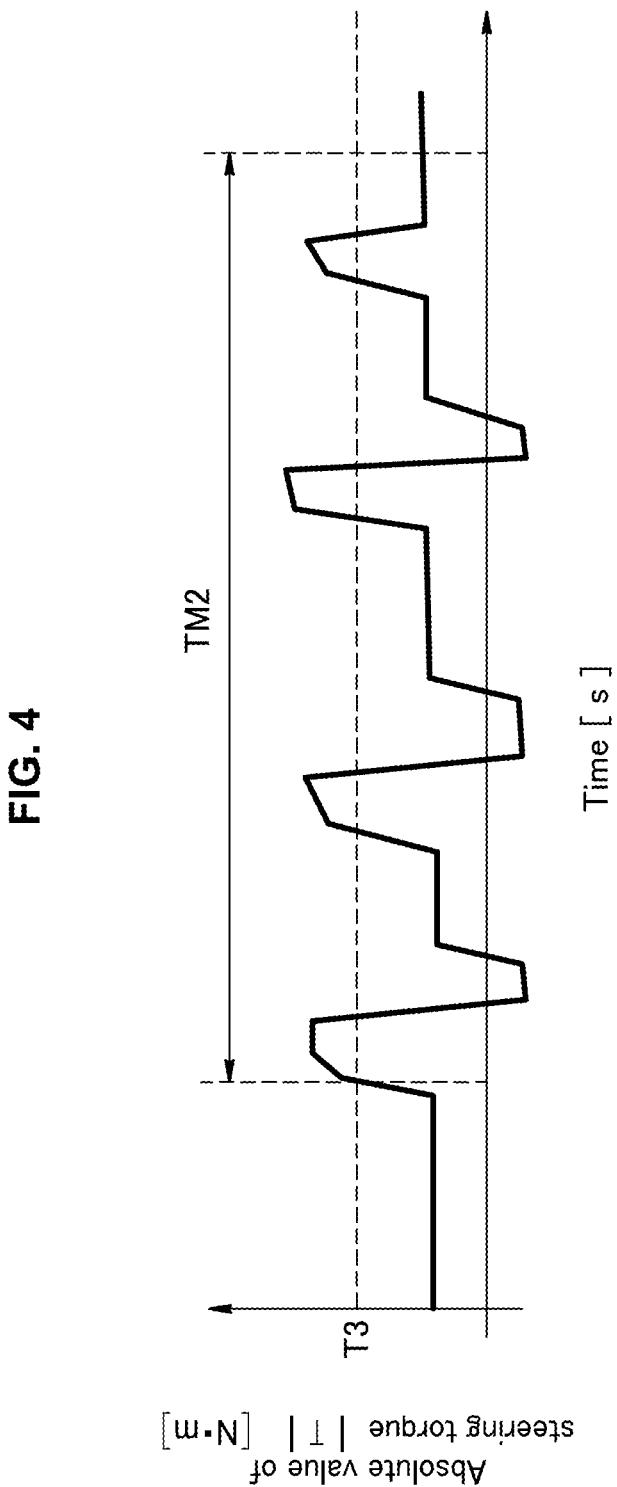
FIG. 4 is a graph showing the absolute value of the steering torque corresponding to the second mode of operation for releasing the output restriction control.

As shown in FIG. 4, when the control unit 15 determines that the absolute value |T| of the steering torque detected by the torque sensor 22 has changed from less than a predetermined threshold T3 to a value equal to or greater than the threshold T3 by a prescribed number of times M1 within a predetermined time period TM2. Once the prescribed number of times M1 has been reached, the control unit 15 determines that the second mode of operation by the operator has been detected, and cancels the output restriction control. The second mode of operation here corresponds to an operation in which the operator intermittently applies the input torque to the steering wheel 19 by the predetermined number of times M1 in a direction against the reaction force torque within the predetermined period. The predetermined number of times M1 may be 2 to 5 times, for example. The measurement of the time period TM2 starts from the first time when the absolute value |T| of the steering torque has increased from a value less than the threshold value T3 to a value equal to or greater than the threshold value T3, and is reset when the time period TM2 has elapsed or the predetermined number of times M1 has been reached.

The control unit 15 may also determine that the prescribed mode of operation or the third mode of operation that triggers the cancelation of the output restriction control has been detected when the switch 37 is operated, for example. The third mode operation here consists of the operation of the switch 37 by the operator. The control unit 15 may cancel the output restriction control when the operation of the switch 37 is detected based on the signal from the switch 37 while executing the output restriction control. The switch 37 may be a switch for switching on/off the output restriction control. In this case, the control unit 15 may prohibit the execution of the output restriction control when the switch 37 is in the OFF state.

The control unit 15 cancels the output restriction control when it is determined that at least one of the first to third modes of operation by the operator has been detected based on a signal from at least one of the torque sensor 22 and the switch 37 serving as the detection device 36. Preferably, it may be arranged such that the control unit 15 cancels the output restriction control upon detecting at least one of the first to third modes of operation while the output restriction control is being executed, and then resumes the output restriction control upon elapsing of a predetermined period thereafter. Alternatively, it may be arranged such that the control unit 15 cancels the output restriction control upon detecting at least one of the first to third modes of operation while the output restriction control is being executed, and then resumes the output restriction control upon elapsing of a prescribed time period after the steering torque has become zero. It may also be arranged such that the control unit 15 prohibits the output restriction control while the switch 37 is in the OFF state, and resumes the output restriction control once the switch 37 has turned into the ON state.

The vehicle steering system 1 described above cancels the output restriction control upon detecting any one of the first to third modes of operation by the operator. Therefore, by supplying a large amount of electric power to the steering actuator 12 under a certain condition, the wheel can be steered even when the wheel is caught in a rut or a groove. Thereby, even when the vehicle steering system 1 is configured to perform the output restriction control, the wheel can be steered out of a rut or a groove without any difficulty.

The vehicle steering system 1 can cancel the output restriction control upon detecting the first mode of operation in which the operator continues to apply a steering torque equal to or greater than the threshold value to the steering member 10, for example. Further, the vehicle steering system 1 can cancel the output restriction control upon detecting the second mode of operation in which the operator applies a steering input torque by a predetermined number of times within the predetermined time period. Since the first mode of operation and the second mode of operation are similar to the operations that the operator would perform when one of the wheels is caught in a rut or the like, the operator is enabled to intuitively perform the first mode of operation and the second mode of operation. The third mode of operation consisting of the operation of the switch 37 can be easily performed even by a novice operator.

The present invention has been described in terms of a specific embodiment, but is not limited by such an embodiment, and can be modified in various ways without departing from the spirit of the present invention. In the foregoing embodiment, the first and second modes of operation by the operator are detected based on the absolute value |T| of the steering input torque T. However, instead of the absolute value |T|, the first and second modes of operation may be detected based on the angle, the change rate of the steering angle, the magnitude of the deviation $\Delta\theta 2$ in the steering angle, and the like.

Figure 6:
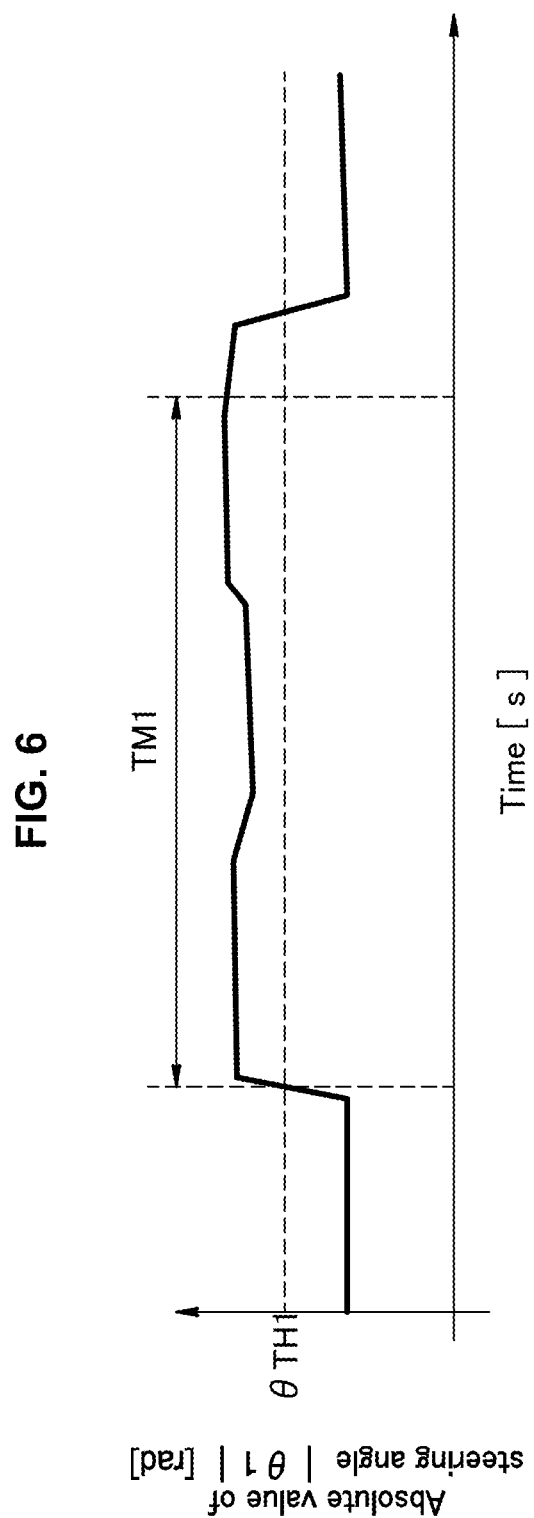
FIG. 6 is a graph showing the absolute value of the steering angle corresponding to the first mode of operation for releasing the output restriction control.

As shown in FIG. 6, for example, when the absolute value |θ1| of the steering angle detected by the steering angle sensor 21 continues to be equal to or greater than a predetermined threshold θTH1 for a prescribed time period TM1, the control unit 15 determines that the first mode of operation is performed by the operator, and cancels the output restriction control. The first mode of operation here corresponds to an operation in which the operator maintains the steering wheel 19 at a predetermined steeling angle against the reaction force torque for the predetermined period. The measurement of the time period TM1 is started when the absolute value |θ1| of the steering angle has changed from a value less than the threshold value θTH1 to a value equal to or greater than the threshold value θTH1. The measurement is reset once the absolute value |θ1| of the steering angle falls below the threshold value θTH1.

As shown in FIG. 7, when the control unit 15 determines that the absolute value |θ1| of the steering angle detected by the steering angle sensor 21 has changed from less than a predetermined threshold θTH2 to a value equal to or greater than the threshold θTH2 by a prescribed number of times M1 within a predetermined time period TM2. Once the prescribed number of times M1 has been reached, the control unit 15 determines that the second mode of operation by the operator has been detected, and cancels the output restriction control. The second mode of operation here corresponds to an operation in which the operator intermittently rotates the steering wheel 19 by the predetermined number of times M1 in a direction against the reaction force torque within the predetermined period. The predetermined number of times M1 may be 2 to 5 times, for example. The measurement of the time period TM2 starts from the first time when the absolute value |θ1| of the steering angle has increased from a value less than the threshold value θTH2 to a value equal to or greater than the threshold value θTH2, and is reset when the time period TM2 has elapsed or the predetermined number of times M1 has been reached.

The invention claimed is:

1. A steer-by-wire vehicle steering system, comprising:
   a steering member;
   a steering angle sensor configured to detect a steering angle of the steering member;
   a torque sensor configured to detect a steering torque applied to the steering member;
   a steering mechanism configured to steer a wheel;
   a steering actuator mechanically separated from the steering member and configured to apply a drive force to the steering mechanism;
   a steered angle sensor configured to detect a steered angle of the wheel;
   a detection unit configured to detect an input operation performed by an operator on the steering member; and
   a control unit configured to control the steering actuator so as to cause the steered angle to correspond to the steering angle and/or the steering torque;
   wherein the control unit is configured to perform an output restriction control including restricting an output of the steering actuator when the steering torque is equal to or greater than a prescribed threshold value, and to cancel the output restriction control including restricting the output of the steering actuator when the input operation performed by the operator is received while the output restriction control including restricting the output of the steering actuator is being executed.

2. The vehicle steering system according to claim 1, wherein the detection unit comprises at least one of the torque sensor and the steering angle sensor, and the control unit is configured to cancel the output restriction control when at least one of the steering torque and the steering angle has continued to be equal to or greater than a prescribed threshold value for a prescribed time period.

3. The vehicle steering system according to claim 1, wherein the detection unit comprises at least one of the torque sensor and the steering angle sensor, and the control unit is configured to cancel the output restriction control when at least one of the steering torque and the steering angle has come to be equal to or greater than a prescribed threshold value by a prescribed number of times within a prescribed time period.

4. The vehicle steering system according to claim 1, wherein the detection unit comprises a manual switch configured to be operated by the operator, and the control unit is configured to cancel the output restriction control when the manual switch is operated.

5. The vehicle steering system according to claim 1, wherein in the output restriction control, the control unit is configured to keep a current value supplied to the steering actuator constant.

6. The vehicle steering system according to claim 1, wherein the control unit is configured to compute a target steering angle based on the steering angle detected by the steering angle sensor, and perform feedback control of the steering actuator based on a deviation of an actual steering angle of the wheel from the target steering angle.

* * * * *